United States Patent [19]

Kawase et al.

[11] 4,205,639
[45] Jun. 3, 1980

[54] ANTI-STALL DEVICE IN A DIESEL ENGINE

[75] Inventors: Kouichi Kawase; Yoshio Ohtani, both of Higashimatsuyama, Japan

[73] Assignee: Diesel Kiki Co., Ltd., Tokyo, Japan

[21] Appl. No.: 917,987

[22] Filed: Jun. 22, 1978

[30] Foreign Application Priority Data

Jun. 25, 1977 [JP] Japan .................................. 52/83693

[51] Int. Cl.² .......................................... F02D 11/10
[52] U.S. Cl. .................................................... 123/102
[58] Field of Search ............... 123/102, 140 R, 119 F, 123/97 B, 32 EL, 139 BG, 140 MC, 140 J, 140 R, 139 E, 32 EA

[56] References Cited

U.S. PATENT DOCUMENTS

| | | | |
|---|---|---|---|
| 3,525,017 | 8/1970 | Rosenberg et al. | 123/102 |
| 3,630,643 | 12/1971 | Eheim | 123/139 E |
| 3,699,935 | 10/1972 | Adler et al. | 123/139 E |
| 3,710,766 | 1/1973 | Beishir | 123/139 E |
| 3,718,123 | 2/1973 | Eckert et al. | 123/139 E |
| 3,722,485 | 3/1973 | Ohtani | 123/102 |
| 3,828,742 | 8/1974 | Weis | 123/102 |
| 3,965,877 | 6/1976 | Adey | 123/102 |
| 4,015,571 | 4/1977 | Stumpp | 123/139 BG |
| 4,062,332 | 12/1977 | Perr | 123/97 B |
| 4,084,559 | 4/1978 | Wallbaum | 123/102 |

*Primary Examiner*—Charles J. Myhre
*Assistant Examiner*—R. A. Nelli
*Attorney, Agent, or Firm*—Stevens, Davis, Miller & Mosher

[57] ABSTRACT

An anti-stall device for an internal combustion engine provided with a fuel injection pump having a fuel control rack and a governor mechanism connected to the fuel control rack and which has a speed control lever, comprising:
- a circuit for generating a dc voltage in proportion to the rotational speed of the engine;
- a circuit for comparing and amplifying an output voltage of the dc voltage generating circuit and a reference voltage corresponding to the idling speed of the engine;
- a timer circuit for receiving outputs of the comparing and amplifying circuit as inputs to generate outputs for a predetermined period of time; and
- an electromagnetic actuator for utilizing the outputs of the timer circuit to drive said fuel control rack in a fuel quantity increasing direction.

1 Claim, 5 Drawing Figures

ANTI-STALL DEVICE IN A DIESEL ENGINE

BACKGROUND OF THE INVENTION

1. Field of the Invention

The present invention relates to an anti-stall device in a Diesel engine, which, in the case of the rapid deceleration of a Diesel engine from its high speed, can prevent a disorderly engine speed resulting from a shortage in the quantity of fuel injected and stalling of the engine resulting from an actuation of an exhaust brake, to thereby obtain stabilized low speed running.

2. Description of the Prior Art

Generally, a spring is provided to serve as a damper so that when the vehicle is rapidly decelerated from its high speed, the fuel control rack of the fuel injection pump is not pulled back in a fuel decreasing direction to a position beyond an idling stabilized position. However, it is extremely difficult to have this spring possess a spring characteristic such as not to interfere with the idling rotation and to mount the spring in a way as just mentioned. Furthermore, in a spring of this kind, when the engine speed is decreased down to the idling speed, the period, during which the fuel control rack is pushed back so as to render the quantity of fuel injection minimal in value, is short and hence it is impossible to anticipate sufficient damping action. When the spring interferes with the idling rotation, it is impossible to obtain efficient engine braking.

Moreover, in a vehicle provided with an exhaust brake, a turn switch is placed in abutment with a speed control lever interlocked with an accelerator pedal so that when the vehicle is decelerated, the turn switch causes the circuit to close thus maintaining closed the exhaust brake valve even at a no-load idling speed of the engine, as a consequence of which sometimes, the engine speeds or a stall occurs.

SUMMARY OF THE INVENTION

It is therefore an object of the present invention to provide an anti-stall device in a Diesel engine, wherein the engine is decelerated to a level less than the idling speed, the change in speed is detected and an electromagnetic actuator is actuated only for a predetermined period of time to control the maximal injection quantity by the fuel control rack, and at the same time, a solenoid valve driving circuit of the exhaust brake is opened to release the exhaust brake.

The invention will be understood more readily by reference to the following embodiment in connection with the accompanying drawings.

DESCRIPTION OF THE PREFERRED EMBODIMENT

Figure 1:
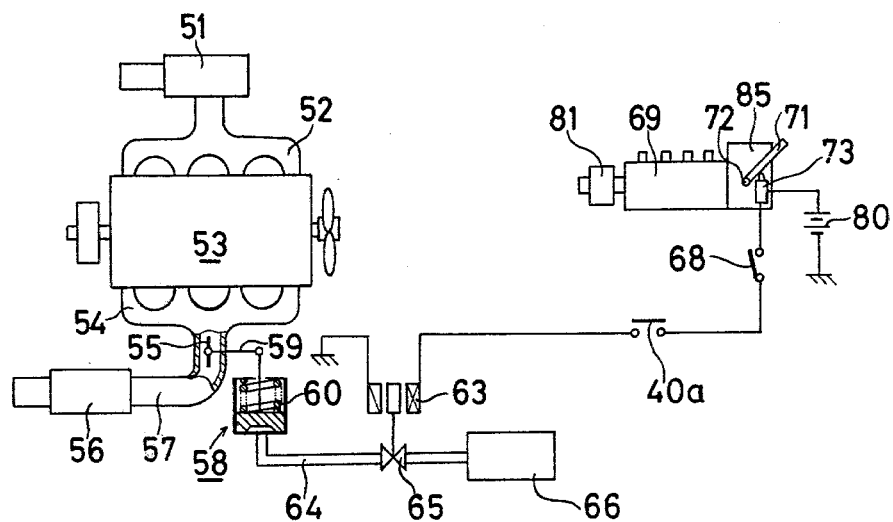
FIG. 1 is a schematic illustration showing a structure of an anti-stall device in a Diesel engine in accordance with the present invention.

The structure of the present invention is hereinafter described by way of the embodiment shown in the drawings.

In FIG. 1 is shown the structure of an engine provided with a fuel injection pump and an exhaust brake, comprising an engine 53, an air cleaner 51, an intake manifold 52, an exhaust manifold 54, an exhaust pipe 57, and a muffler 56. An exhaust brake valve 55, which is disposed in the midst of the exhaust pipe 57, is connected through a lever 59 to a fluid pressure actuator 58. The fluid pressure actuator 58 has a cylinder which receives therein a piston having a rod coupled to the lever 59. The cylinder is partitioned by the piston into two chambers, one being provided with a return spring 60 and the other being supplied with compressed air from a tank 66 through a line 64. Intermediate in line 64 there is connected a solenoid valve 65, of which electromagnetic coil 63 has one end connected to a power supply line of a electrical power source 80 through a normally open contact 40a, a hand switch 68 and a turn switch 73, and the other end connected to a ground terminal of the source 80, to constitute a solenoid valve driving circuit.

Figure 2:
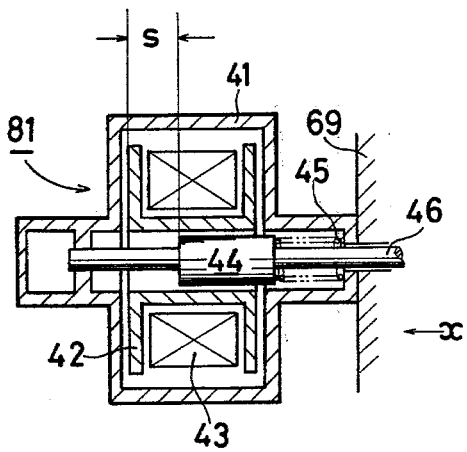
FIG. 2 is a longitudinal sectional view of a principal portion of the device.

The turn switch 73 is turned on and off by a speed control lever 71, which is secured by a pivot 72 to a known governor mechanism 85 of the fuel injection pump 69. The turn switch 73 is turned on by rotation of the speed control lever 71 in a decelerating direction. The fuel injection pump 69 is provided with an electromagnetic actuator 81 opposite the speed governor mechanism 85. The electromagnetic actuator 81 is constructed, as shown in FIG. 2, in which a case 41 is secured to the end wall of the injection pump 69, the case 41 accommodating therein an electromagnetic coil 43 wound about a spool 42, and a rod 46 extends through the spool 42 and is slidably supported on the opposite ends of the case 41. The rod 46 has its right end coupled to a known fuel control rack of the injection pump 69. The rod 46 has a magnetic body 44 of a magnetic substance secured to the central portion thereof, and a buffer spring 45 interposed between the magnetic body 44 and the end wall of the case 41. When at idling speed, the magnetic body 44 is biased rightwardly from the center of the coil 43, that is, in the fuel decreasing direction, and at this time, the spring 45 does not effectively exert a force on the magnetic body 44.

Figure 3:
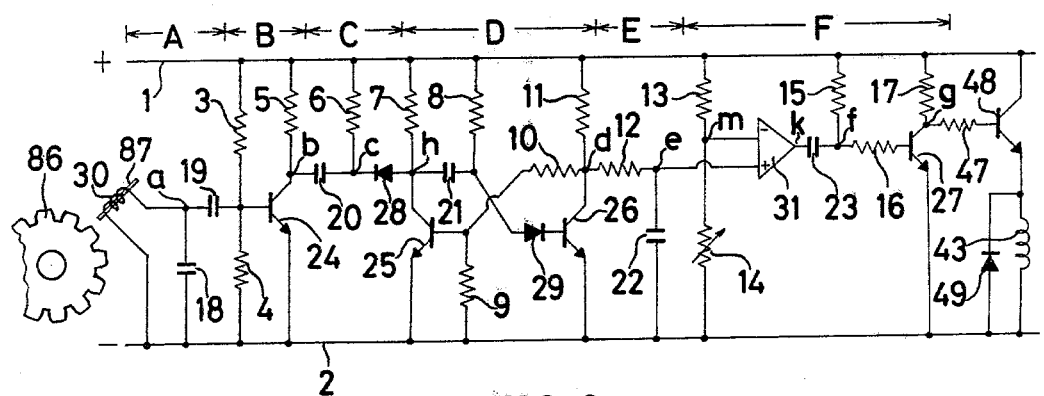
FIG. 3 is an electrical circuit diagram of a fuel injection quantity increasing system for the device.

An electric circuit for controlling the electromagnetic actuator 81, shown in FIG. 3, comprises an engine speed detector circuit A, a squaring amplifier circuit B, a differential circuit C, a monostable multivibrator circuit D, an integrator circuit E and a comparator and amplifier circuit F.

In FIG. 3 is shown an electrical power supply line 1; a common ground terminal 2; resistors 3–17 and 47; capacitors 18–23; transistors 24–27 and 48; diodes 28, 29 and 49; a rotational speed detecting coil 30; an operation amplifier 31; and an electromagnetic coil 43 of the electromagnetic actuator 81.

The speed detector circuit A comprises a non-contact voltage generator for transducing the number of revolutions to voltage. The generator consists of a permanent magnet 87 and a detection coil 30 which are located adjacent to the gear-like magnetic body 86 (magnetic substance) coupled to a cam shaft of the fuel injection pump 69. When the magnetic body 86 is rotated a voltage $V_A$, FIG. 5a is induced in the detection coil 30 wound about the permanent magnet. The voltage $V_A$ is delivered and amplified in the squaring amplifier circuit B, which comprises the resistors 3–5 and a transistor 24, through a filter circuit comprised of capacitors 18 and 19.

Next, in the differential circuit C comprised of capacitor 20 and resistor 6, the voltage $V_B$, FIG. 5b, from the squaring amplifier circuit B is differentiated to form a trigger pulse. The trigger pulse, FIG. 5c, is wave-detected by the diode 28 into a trigger pulse representative of only negative potential. In order to provide a rectangular waveform of given pulse width, the aforesaid trigger pulse is fed to the monostable multivibrator circuit D comprised of transistors 25, 26, load resistors 7, 11, a bias resistor 9, a base resistor 10, a time constant setting resistor 8 and a capacitor 21. An output signal, FIG. 5d, from the monostable multivibrator circuit D is integrated in the integrator circuit E comprised of resistor 12 and capacitor 22 into a dc voltage $V_E$, FIG. 5e, in proportion to pulse density, i.e., engine speed.

Figure 5:
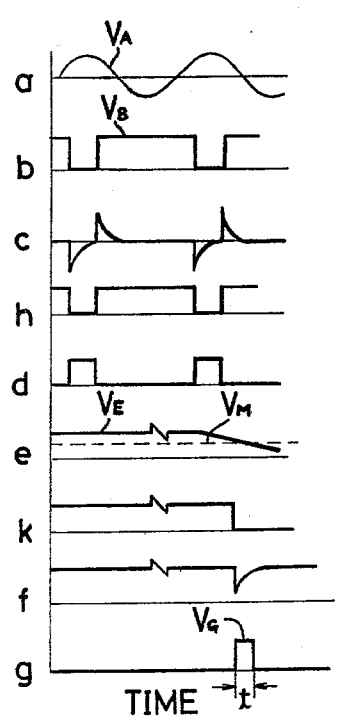
FIG. 5 shows voltage variations of assistance in explaining the operation of the device in accordance with the present invention.

The dc voltage $V_E$ is applied to the positive (+) input terminal of the operation amplifier 31, whereas a voltage $V_M$, FIG. 5e, corresponding to the idling speed and divided by the resistor 13 and the set resistor 14 is applied to the negative (−) input terminal so that the output voltage from the integrator circuit E, i.e., voltage $V_E$ at point e is lower than voltage $V_M$ at point m, the output voltage of the operation amplifier 31 is made zero (0), and the capacitor 23 is temporarily discharged. The transistor 27 is brought into an "off" condition by time determined depending on the capacity of the capacitor 23 to increase voltage $V_G$ of the collector so that the power transistor 48 is driven to excite the electromagnetic coil 43. With the construction described above, the capacity of capacitor 23 serves to set the period of time "t" (FIG. 5g) to actuate the electromagnetic actuator 81 in the fuel increasing direction (as indicated by the arrow x in FIG. 2). FIG. 5 shows variations in voltage at points a–h, and k in the circuit in FIG. 3.

Figure 4:
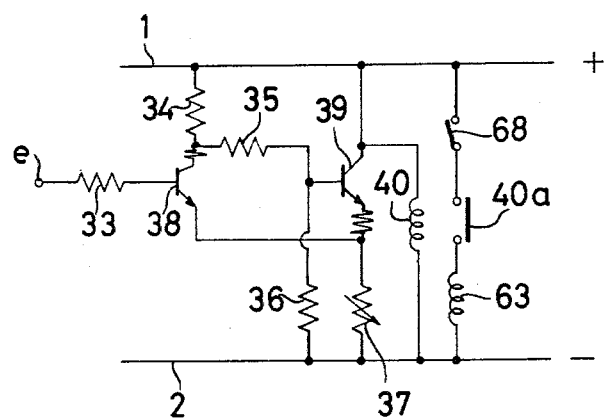
FIG. 4 is an electrical circuit diagram of an exhaust brake system for the device.

On the other hand, in order that the exhaust brake may be released when the engine is decelerated to the idling speed, a switching circuit as shown in FIG. 4 is provided in which the output voltage $V_E$ of the inegrator circuit E serves as input and the contact 40a shown in FIG. 1 is open.

The switching circuit shown in FIG. 4 comprises resistors 33–37, transistors 38 and 39, and the contact 40a driven by a relay 40.

With the structure noted above, when the engine is under the condition of running at a high speed, the output voltage $V_E$ from the integrator circuit E is at a level higher than Schmidt level, the transistor 38 is on an "on" condition whereas the transistor 39 is on an "off" condition, the relay 40 is excited and the contact 40a is closed. Also, the output voltage $V_E$ of the integrator circuit E is higher than the voltage $V_M$ at point m, the capacitor 23 is charged into a predetermined level of voltage, the transistor 27 is on an "on" condition, and the coil 43 of the electromagnetic actuator 81 is in an unexcited condition.

In operation, when the accelerator pedal is released, the speed control leverl 71 pivots clockwise about the pivot 72 in association with the release of the pedal to close the turn switch 73 shown in FIG. 1. Since the contact 40a is closed as previously mentioned, if the hand switch 68 remains closed, the electromagnetic coil 63 is excited to open the solenoid valve 65. Thus, compressed air from the tank 66 enters the fluid pressure actuator 58 via the line 64, and the piston rod extends against the spring 60 to operate the brake valve 55 to close the exhaust pipe 57, thus producing the braking force.

When the braking action causes the engine to be decelerated to the idling speed, the output voltage $V_E$ of integrator circuit E becomes lower than the Schmidt level, the transistor 38 becomes on an "off" condition whereas the transistor 39 is on an "on" condition, and the relay 40 is de-excited to open the contact 40a. Even if the turn switch 73 remains closed, an electric current does not flow into the coil 63 of the solenoid valve so that the solenoid valve 65 (three way valve) cuts off a passage between the actuator 58 and the tank 66 and causes the actuating chamber of the actuator 58 to come into communication with open air (the atmosphere). Accordingly, the piston rod is withdrawn by the action of the spring 60 to open the exhaust brake valve 55. In this manner, the exhaust brake is released.

The operating point of the relay 40, that is, the engine speed to release the exhaust brake may be adjusted by the resistor 37.

When the output voltage $V_E$ of the integrator circuit E becomes lower than the voltage $V_M$ at point m, the capacitor 23 is discharged as previously described, and for a period of the discharge, the transistor 27 is placed in an "off" condition whereas the transistor 48 is on an "on" condition and the electromagnetic coil 43 is excited. Thus, the magnetic body 44 is attracted by the coil 43 toward the direction as indicated by the arrow x in FIG. 2 to cause the fuel control rack, to be moved in the fuel increasing direction. The amount of movement of the rod 46 is as much as stroke s shown in FIG. 2, and the period of operation thereof is as much as for the discharge of the capacitor 23. After the lapse of the aforesaid period, the fuel control rod is released from the electromangetic actuator 81 and left in the operation of the governor mechanism 85.

The electromagnetic actuator 81 forcibly acts on the controlling spring of the governor mechanism 85 to quickly return the fuel control rod to its stabilized position from the excessively withdrawn position. Thus, the engine speed is immediately stabilized without being excessively lowered. It is to be noted that the spring 45 is provided to damp excessive movement of the fuel control rod 46 when the engine is rapidly decelerated from its high speed to the idling speed.

In accordance with the present invention, as described above, when the speed change of the engine is detected as a voltage change and a voltage in proportion to the rotational speed becomes lower than the voltage corresponding to the idling speed of the engine, the relay is made inoperable through the switching circuit to open the solenoid valve driving circuit and cut off the fluid pressure actuator for driving the exhaust brake valve from the fluid pressure source to release the exhaust brake. In addition, the voltage corresponding to the engine speed and a reference voltage corresponding to the idling speed of the engine are compared in the operation amplifier and when the engine becomes lower in speed than the idling speed, the electromagnetic actuator is allowed to forcibly act on the controlling spring of the governor for a predetermined period of time so as to quickly return the fuel control racks to the idling position from the excessively withdrawn position. With the arrangement of the present invention, the engine may be stabilized at idling speed in an extremely quick and smooth manner in the event that particularly, the vehicle jointly using the exhaust brake is rapidly operated to be decelerated, to thereby prevent stalling, hunting, disorderly running, etc. Thus it is possible to greatly enhance the running performance of vehicles of the type propelled by a Diesel engine which is quite often operated at low speeds.

What is claimed is:

1. An anti-stall device in an internal combustion engine provided with a fuel injection pump having a fuel control rack and a governor mechanism connected to said fuel control rack and which has a speed control lever and an exhaust brake valve, comprising:

- an engine speed detector circuit for generating alternative voltage in synchronism with the revolution of the engine;
- a squaring amplifier circuit for converting the output of said engine speed detecting circuit to a rectangular waveform pulse signals;
- a differential circuit for generating trigger pulse signals from the output of said squaring amplifier circuit;
- a monostable multivibrator circuit for producing a predetermined rectangular waveform pulse from said trigger pulse signals;
- an integrator circuit for producing dc voltage in proportion to the engine speed from the output of said monostable multivibrator circuit;
- a comparator and amplifier circuit for comparing the output of said integrator circuit and a reference voltage corresponding to the idling speed of the engine;
- a timer circuit for receiving outputs of said comparing and amplifying circuit as inputs to generate outputs for a predetermined period of time;
- an electromagnetic actuator for utilizing the outputs of said timer circuit to drive said fuel control rack in a fuel quantity increasing direction;
- a hydraulic actuator for driving said exhaust brake valve;
- a solenoid valve for switching a hydraulic circuit;
- a relay switch connected in the circuit for driving said solenoid valve;
- a switching circuit driven by the outputs of said integrator circuit to drive said relay switch; and
- a switch adapted to be closed in the idling position of said speed control lever and which is connected in series with said normally opened contact in the circuit for energizing said solenoid valve.

* * * * *